United States Patent
Honda

(10) Patent No.: US 12,237,966 B2
(45) Date of Patent: Feb. 25, 2025

(54) NETWORK MANAGEMENT APPARATUS AND NETWORK MANAGEMENT METHOD FOR VERIFYING ALTERNATIVE NETWORK CONFIGURATIONS

(71) Applicant: RAKUTEN MOBILE, INC., Tokyo (JP)

(72) Inventor: Yoshimi Honda, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 0 days.

(21) Appl. No.: 17/774,584

(22) PCT Filed: Sep. 2, 2021

(86) PCT No.: PCT/JP2021/032239
§ 371 (c)(1),
(2) Date: May 5, 2022

(87) PCT Pub. No.: WO2023/032112
PCT Pub. Date: Mar. 9, 2023

(65) Prior Publication Data
US 2024/0163159 A1    May 16, 2024

(51) Int. Cl.
*H04L 41/0654* (2022.01)
*H04L 43/062* (2022.01)
*H04L 47/127* (2022.01)
*H04L 41/147* (2022.01)
*H04L 43/0876* (2022.01)
*H04L 43/0882* (2022.01)
*H04L 45/28* (2022.01)

(52) U.S. Cl.
CPC ........ *H04L 41/0654* (2013.01); *H04L 43/062* (2013.01); *H04L 47/127* (2013.01)

(58) Field of Classification Search
CPC .. H04L 41/0654; H04L 43/062; H04L 47/127
See application file for complete search history.

(56) References Cited

U.S. PATENT DOCUMENTS

| | | | |
|---|---|---|---|
| 7,859,993 B1 * | 12/2010 | Choudhury | H04L 45/125 370/231 |
| 8,312,145 B2 * | 11/2012 | Rabie | H04L 47/762 709/227 |

(Continued)

FOREIGN PATENT DOCUMENTS

| JP | 2000-059426 A | 2/2000 |
|---|---|---|
| JP | 2015-188135 A | 10/2015 |

*Primary Examiner* — Kamal M Hossain
(74) *Attorney, Agent, or Firm* — Sughrue Mion, PLLC

(57) ABSTRACT

A network management apparatus acquires link information indicating a supportable communication rate for each of links among a plurality of nodes, acquires traffic type information indicating a traffic type transmitted among the plurality of nodes, acquires statistical information indicating an amount of traffic among the plurality of nodes, and verifies, in a case where it is assumed that a pseudo-failure has occurred on one or more links among the plurality of the nodes, verify a risk of using one or more links on which no pseudo-failure has occurred based on the link information, the traffic type information, and the statistical information.

12 Claims, 6 Drawing Sheets

(56) References Cited

U.S. PATENT DOCUMENTS

| | | | |
|---|---|---|---|
| 2005/0132051 A1* | 6/2005 | Hill | H04L 43/0894 |
| | | | 709/226 |
| 2010/0214920 A1* | 8/2010 | Tewani | H04L 47/2441 |
| | | | 370/232 |
| 2016/0099865 A1* | 4/2016 | Klincewicz | H04L 45/28 |
| | | | 370/218 |
| 2016/0218943 A1* | 7/2016 | Djukic | H04L 43/0894 |
| 2018/0048531 A1* | 2/2018 | Nishioka | H04L 41/142 |
| 2022/0191303 A1* | 6/2022 | Gupta | H04L 67/61 |

* cited by examiner

FIG. 3

|  | WEEDDAYS | SATURDAY | SUNDAY | HOLIDAY |
|---|---|---|---|---|
| 10:00 am to 11:00 am | MEAN AND DERIVATION | MEAN AND DERIVATION | MEAN AND DERIVATION | MEAN AND DERIVATION |
| 11:00 am to 12:00 am | ... | ... | ... | ... |
| 12:00 am to 1:00 pm | ... | ... | ... | ... |
| ... | ... | ... | ... | ... |

NETWORK MANAGEMENT APPARATUS AND NETWORK MANAGEMENT METHOD FOR VERIFYING ALTERNATIVE NETWORK CONFIGURATIONS

CROSS REFERENCE TO RELATED APPLICATIONS

This application is a National Stage of International Application No. PCT/JP2021/032239 filed Sep. 2, 2021.

TECHNICAL FIELD

The present invention relates to a technology for managing a network consisting of links among a plurality of nodes.

BACKGROUND ART

In recent years, a Virtual Private Network (VPN) has been used as a transfer technology in a virtual network which connects a plurality of nodes between remote locations. The VPN refers to a virtual dedicated line connecting the nodes. An IP-VPN out of the VPNs is a network which connects to IP communication lines and constructs the VPN inside them to connect remote nodes.

The IP-VPN uses dedicated IP communication lines, so it enables to reduce a risk of unauthorized accesses and is highly secure. In addition, the IP-VPN enables high-speed routing by assigning a Multi Protocol Label Switching (MPLS) label to an IP packet to be forwarded and referring the labels to determine a forwarding destination. The MPLS is a forwarding technology that identifies the destination by attaching the label instead of an address to header information.

On the other hand, in order to maintain communication stability, rapid control for failure recovery would be required when a link failure occurs among nodes.

Patent Literature 1 discloses a technique for performing rapid control for failure recovery, when a link failure occurs, by forwarding packets according to a routing table for failure recovery updated by a central control center.

LISTING OF REFERENCES

Patent Literature

PATENT LITERATURE 1: Laid-open Publication of Japanese patent Application No. 2000-59426 A

SUMMARY OF THE INVENTION

Problems to be Solved by the Invention

In conventional operations in link failures, when a failure occurs on a certain link among a plurality of nodes, all links and all nodes may be prohibited from being used in order to reconfigure a network, even though the failed link is only a part of the network. This resulted in poor workability and unoptimized operational costs. Therefore, a network reconfiguration mechanism based on the assumption of link failure occurrence should be considered.

The MPLS technology includes a traffic engineering function that optimizes a network configuration based on a network traffic status when a link failure occurs. However, the MPLS technology does not include a mechanism of reconfiguring a network on the assumption of a link failures and verifying a risk thereby in advance. In other words, the MPLS technology includes no mechanism for network reconfiguration based on the assumption of link failures.

On the other hand, according to Patent Literature 1, when a link failure occurs, rapid failure recovery is possible by control by a central control center. Meanwhile, a link usage is not constant and may vary, so network should be reconfigured appropriately according to the link usage in a failure recovery.

In addition, in order to provide stable communication quality, it is also important to construct an appropriate network configuration that takes into account future traffic usage, regardless of link failure occurrence.

The present invention has been made in order to the above mentioned problems and an object thereof is to provide a technique for network management assuming link failure occurrence and future traffic.

Solution to Problem

In order to solve the above mentioned problems, according to one aspect of the present invention, there is provided a network management apparatus which comprises: a first acquisition unit configured to acquire link information indicating a supportable communication rate for each of links among a plurality of nodes; a second acquisition unit configured to acquire traffic type information indicating a traffic type transmitted among the plurality of nodes; a third acquisition unit configured to acquire statistical information indicating an amount of traffic among the plurality of nodes; and a verification unit configured to verify, in a case where it is assumed that a pseudo-failure has occurred on one or more links among the plurality of the nodes, a risk of using one or more links on which no pseudo-failure has occurred based on the link information, the traffic type information, and the statistical information.

The verification unit may verify the risk for each of a plurality of traffic types.

Each of the traffic types may be assigned a priority, and the verification unit may verify the risk for each of the traffic types in order of the priority.

The verification unit verifies the risk of using one or more paths formed by links including one or more links on which no pseudo-failure has occurred.

According to another aspect of the present invention, there is provided a network management apparatus which comprises: a first acquisition unit configured to acquire link information indicating a supportable communication rate for each of links among a plurality of nodes, a second acquisition unit configured to acquire traffic type information indicating a traffic type transmitted among the plurality of nodes, a third acquisition unit configured to acquire predicted utilization information indicating a predicted amount of traffic among the plurality of nodes, and a verification unit configured to verify whether a rate is to be increased for each of the links among the plurality of nodes based on the link information, the traffic type information, and the predicted utilization information.

The network management apparatus may comprise a notification unit configured to notify a result of the verification by the verification unit.

The traffic type may include traffic according to a bandwidth-guaranteed service and traffic according to best-effort type service.

The traffic type may correspond to a type of network slicing as specified in the Third Generation Partnership Project (3GPP).

According to one aspect of the present invention, there is provided a network management method which comprises: acquiring link information indicating a supportable communication rate for each of links among a plurality of nodes, acquiring traffic type information indicating a traffic type transmitted among the plurality of nodes, acquiring statistical information indicating an amount of traffic among the plurality of nodes; and verifying, in a case where it is assumed that a pseudo-failure has occurred on one or more links among the plurality of the nodes, a risk of using one or more links on which no pseudo-failure has occurred based on the link information, the traffic type information, and the statistical information.

According to another aspect of the present invention, there is provided a network management method which comprises: acquiring link information indicating a supportable communication rate for each of links among a plurality of nodes, acquiring traffic type information indicating a traffic type transmitted among the plurality of nodes, acquiring predicted utilization information indicating a predicted amount of traffic among the plurality of nodes, and verifying whether a rate is to be increased for each of the links among the plurality of nodes based on the link information, the traffic type information, and the predicted utilization information.

According to one aspect of the present invention, there is provided a control program for causing a computer to execute network management processing, the program causing the computer to execute processing which comprises: a first acquisition process for acquiring link information indicating a supportable communication rate for each of links among a plurality of nodes, a second acquisition process for acquiring traffic type information indicating a traffic type transmitted among the plurality of nodes, a third acquisition process for acquiring statistical information indicating an amount of traffic among the plurality of nodes, and a verification process for verifying, in a case where it is assumed that a pseudo-failure has occurred on one or more links among the plurality, a risk of using one or more links on which no pseudo-failure has occurred based on the link information, the traffic type information, and the statistical information.

According to another aspect of the present invention, there is provided a control program for causing a computer to execute network management processing, the program causing the computer to execute processing which comprises: a first acquisition process for acquiring link information indicating a supportable communication rate for each of links among a plurality of nodes, a second acquisition process for acquiring traffic type information indicating traffic types transmitted among the plurality of nodes, a third acquisition process for acquiring predicted utilization information indicating a predicted amount of traffic among the plurality of nodes, and a verification process for verifying whether a rate is to be increased for each of the links among the plurality of nodes based on the link information, the traffic type information, and the predicted utilization information.

Advantageous Effect of the Invention

According to the present invention, it makes it possible to perform network management with an assumption of pseudo link failure occurrence and future traffic.

BRIEF DESCRIPTION OF DRAWING

FIG. 3 illustrates an example of statistical information.

DESCRIPTION OF EMBODIMENTS

Figure 1:
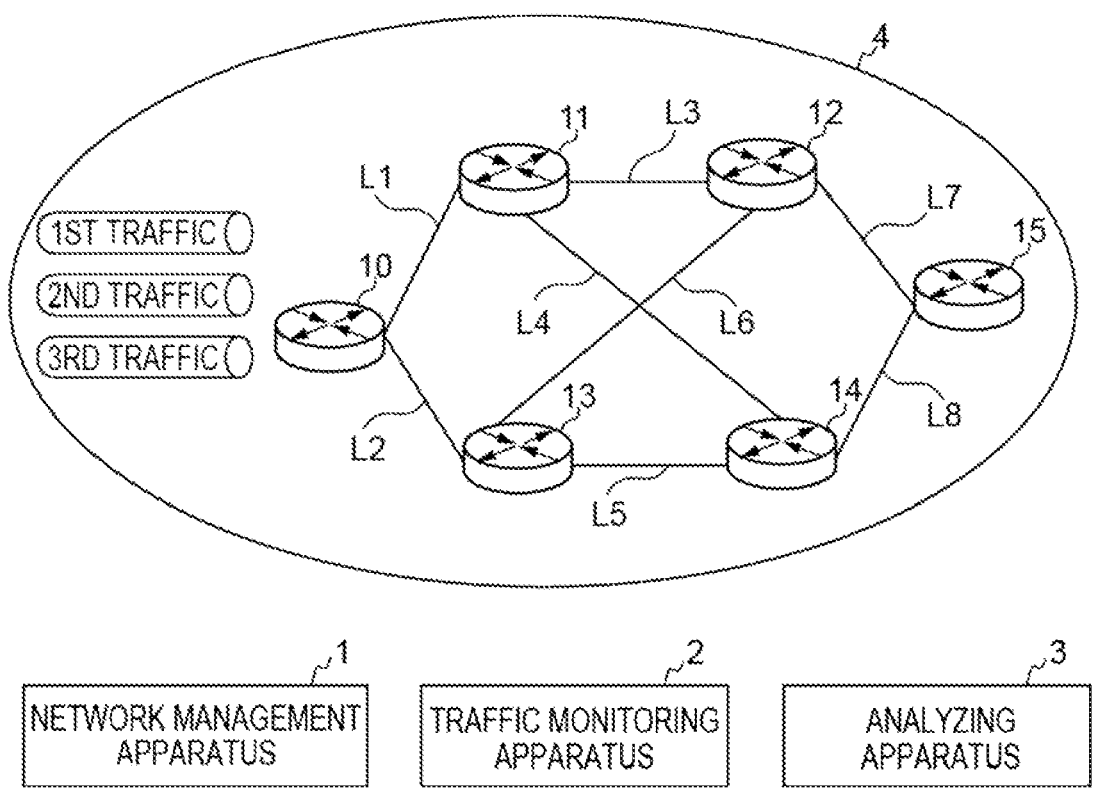
FIG. 1 illustrates an example of a configuration of a network system according to embodiments of the present invention.

Hereinafter, embodiments of the present invention will be described in detail with reference to the accompanying drawings. Among the constituent elements disclosed below, those having the same function are denoted by the same reference numerals, and a description thereof is omitted. It should be noted that the embodiments disclosed herein are illustrative examples as means for implementing the present invention, and should be appropriately modified or changed depending on a configuration and various conditions of an apparatus to which the present invention is applied, and the present invention is not limited to the following embodiments. Furthermore, it should be noted that all of the combinations of features described in the following embodiments are not necessarily essential to the solution of the present invention.

First Embodiment

<Configuration of Network System>

FIG. 1 illustrates an example of a configuration of a network system according to the present embodiment.

As shown in FIG. 1, this network system comprises an IP network 4, nodes 10 to 15 such as switches or routers connected to the IP network 4, a network management apparatus 1, a traffic monitoring apparatus 2, and an analyzing apparatus 4. As shown in FIG. 1, the nodes 10 to 15 are connected by links L1 to L8.

A communication rate (i.e., a data transfer rate) supported (i.e., guaranteed) by the links L1 to L8 may be set by the nodes which configure each link. For example, the communication rate of the link L1 is determined by at least one of the nodes 10 and 11. Alternatively, the communication rate supported by each link may be pre-set by the network management apparatus 1 or an unshown apparatus in the system, based on functions of each node, etc. In the following description, information on a supportable communication rate for each link is referred to as link information.

The network management apparatus 1 manages a network consisting of links L1 to L8. For example, the network management apparatus may verify whether traffic according to one or more services can be transmitted in the network so as to meet the requirements for the services (i.e., whether network reconfiguration is possible). Traffic types according to one or more services are described below.

The traffic monitoring apparatus 2 is configured to check an amount of traffic (i.e., a link usage) transmitted in the network consisting of the links L1 to L8, and derive information on changes as statistical information. The statistical information may be obtained by a software such as a Multi Router Traffic Grapher (MRTG). The traffic monitoring apparatus 3 is also configured to predict an amount of traffic to be transmitted in the future based on the statistics information which had been already derived, for example, by using machine learning. An example of the statistical information is described below referring to FIG. 3.

The analyzing apparatus 3 is an apparatus controlled by an entity which manages the network system such as a telecommunications carrier and communicates with the network management apparatus 1. For example, the analyzing apparatus 3 may assume that a pseudo-failure has occurred (i.e., link down) on at least one of the links L1 to L8, and outputs, to the network management apparatus 1, information for identifying the links on which the pseudo-failure has occurred (i.e., identification information) as a link failure pseudo information.

The analyzing apparatus 3 also has a function for performing various analyses from the verification results output from the network management apparatus 1.

In the present embodiment, the network management apparatus 1 verifies whether network reconfiguration is possible or not when it is assumed that a pseudo-failure has occurred on one of the links L1 to L8. Specifically, when the network management apparatus 1 receives the link failure pseudo information from the analyzing apparatus 3, it verifies a risk of using a link on which no pseudo-failure has occurred (i.e., an alternative link) in order to reconfigure the network.

Multiple types of traffic are transmitted on links L1 to L8.

The nodes 10 to 15 may, for example, obtain traffic types based on header information of packets transmitted. The network management apparatus 1 may obtain such traffic type information, for example, by notification from the nodes 10 to 15.

Alternatively, the traffic to be transmitted may be set in advance in the network system by a telecommunication carrier or other parties. In such case, the network management apparatus 1 may obtain the traffic type information in the network system.

In the present embodiment, the multiple types of traffic are assumed, including three types of traffic (i.e., first traffic, second traffic, and third traffic).

The first traffic is traffic according to a bandwidth-guaranteed service. The bandwidth-guaranteed service has a feature that communication quality is high due to guaranteed communication bandwidth. In the present embodiment, the bandwidth-guaranteed service is assumed to be a service that guarantees a communication rate (i.e., throughput) of 10 Mbps.

The second and third traffic are traffic according to best-effort type services. The best-effort type service may experience extremely slow communication speeds or packet loss because the throughput varies depending on the network usage. Both the second and third traffic may be best-effort type services having a communication rate (i.e., throughput) of up to 100 Mbps. The second traffic corresponds to the best-effort type service for mobile, and the third traffic corresponds to the best-effort type service for corporate customers.

<Functional Configuration of Network Management Apparatus>

Figure 2:
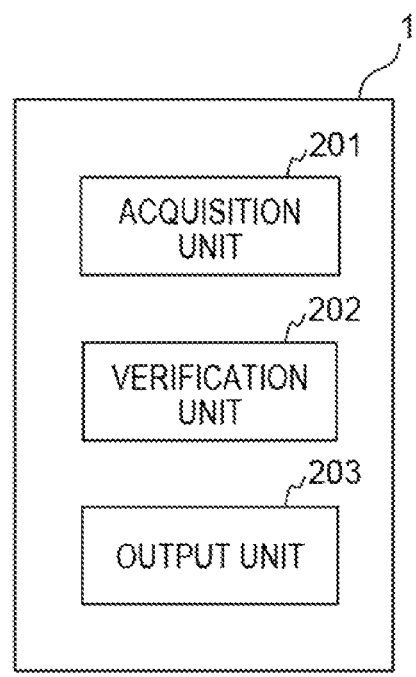
FIG. 2 illustrates an example of a functional configuration of a network management apparatus according to embodiments of the present invention.

FIG. 2 illustrate an example of a functional configuration of the network management apparatus 1. The network management apparatus 1 acquires link information (i.e., information on a supportable communication rate for each link), traffic type information, and statistical information (i.e., information on the amount of traffic transmitted in the network), and, when a failure is occurred in any of the links L1 to L8, uses the information to verify a risk of using another link to reconfigure the network.

The network management apparatus 1, as an example of its functional configuration, has an acquisition unit 201, a verification unit 202, and an output unit 203.

The acquisition unit 201 acquires link information, traffic type information, and statistical information. The acquisition process of the three types of information is explained with reference to the network system shown in FIG. 1.

The link information: the acquisition unit 201 acquires the link information for each of the links L1 to L8 from the nodes 10 to 15. In a case where the link information has been previously set by the network management apparatus 1 and registered in a memory (see FIG. 3), the acquisition unit 201 may acquire the link information that was previously set and stored.

The traffic type information: the acquisition unit 201 acquire, as the traffic type information, information on types of traffic transmitted on the links L1 to L8 according to one or more services. In a case where traffic type information has been previously set by the network management apparatus 1 and registered in the memory (see FIG. 3), the acquisition unit 201 may acquire the traffic type information that was previously set and stored.

The statistical information: the acquisition unit 201 acquires the statistical information, derived by the traffic monitoring apparatus 2, indicating changes in the amount of traffic transmitted on the links L1 to L8. An example of the statistical information is described below referring to FIG. 3.

FIG. 3 illustrates an example of the statistical information derived by the traffic monitoring apparatus 2. The statistical information shown in FIG. 3 is represented by grids of days of the week, holidays, and hours, with each grid showing a mean and a deviation of hourly traffic volumes on weekdays, Saturdays, Sundays, or holidays. The statistical information may can be obtained by software such as the MRTG. The maximum traffic in each grid can be calculated by multiplying the mean and the deviation in each grid.

The traffic monitoring apparatus 2 may derive the statistical information for a given period of time in the past, such as the past few days, weeks, or months. The traffic monitoring apparatus 2 may derive the statistical information in two dimensions, as shown in FIG. 3, which are days of the week/holidays and time, or it may derive the statistical information in more dimensions, including location and other information. The traffic monitoring apparatus 2 may also derive the statistical information for specific periods or locations, such as consecutive holidays or events.

Returning to the explanation in FIG. 2, the acquisition unit 201 further acquires the link failure pseudo information from the analyzing apparatus 3. The link failure pseudo information includes identification information of any of the links L1 to L8 on which a pseudo-failure has occurred.

The verification unit 202, in a case where failure pseudo information is received from the analyzing apparatus 3, verifies a possibility of the network reconfiguration based on the link information, the traffic type information, and the statistical information acquired by the acquisition unit 201. In other words, the verification unit 202 verifies a risk of using a link on which no pseudo-failure has occurred (i.e., an alternative link) for reconfiguring the network based on the link information, the traffic type information, and the statistical information in a case where it is assumed that a pseudo-failure has occurred on any of the links L1 to L8. The verification unit 202 outputs a result from the verification to the output unit 203 as a verification result.

The output unit 203 outputs the verification result by the verification unit 202. For example, the output unit 203 displays the verification result on a display unit 406. Alternatively, the output unit 203 may output (e.g., transmit) the verification result to an external apparatus.

<Hardware Configuration of Network Management Apparatus>

Figure 4:
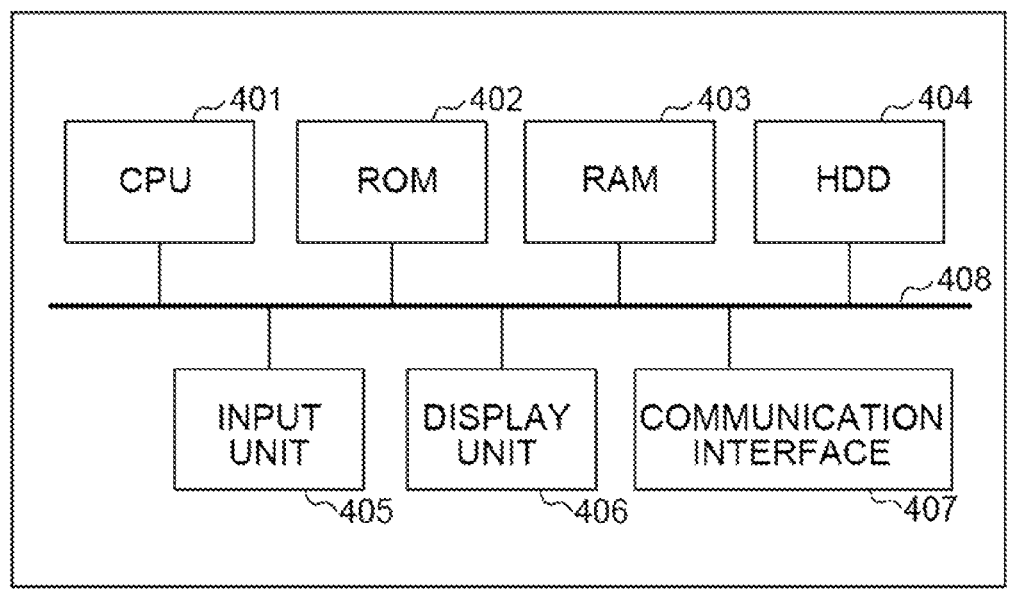
FIG. 4 illustrates an example hardware configuration of a network management apparatus according to embodiments of the present invention.

FIG. 4 illustrates a non-limiting example of a hardware configuration of the network management apparatus 1.

The network management apparatus 1 in the present embodiment may be implemented on a single or multiple, any computer or any other processing platform. The network management apparatus 1 may be implemented on a general-purpose server device comprising a cloud, or on a dedicated server device.

Referring to FIG. 4, the network management apparatus 1 is shown as being implemented in a single computer, while the network management apparatus 1 according to the present embodiment may implemented in a computer system including multiple computers. The following is an example of a case in which this is the case. The plurality of computers may be connected communicatively with each other by a wired or wireless network.

As shown in FIG. 4, the network management apparatus 1 consists of a Central Processing (CPU) 401 and a Read Only Memory (ROM) 402, a Random Access Memory (RAM) 403, a Hard Disc Drive (HDD) 404, an input unit 405, a display unit 406, a communication interface (I/F) 407 and a system bus 408. The network management apparatus 1 may also be equipped with an external memory.

The CPU 401 is for controlling the operation of each of the components (i.e., the components 402 to 407) via the system bus 48 which is a data transmission path to control the overall operation in the network management apparatus 1.

The ROM 402 is a nonvolatile memory that stores a control program or the like which is necessary for the CPU 401 executing processing. The program may be stored in a non-volatile memory such as the HDD 404, a Solid-State Drive (SSD), or in an external memory such as a removable storage medium (not shown).

The RAM 403 is a volatile memory and functions as the main memory, work area, etc., for CPU 401. In other words, the CPU 401, when executing processing, loads the necessary programs, etc., stored in the ROM 402 onto the RAM 403 and executes the program to realize various functional operations.

The HDD 404 stores, for example, various data, various information, etc., necessary for the CPU 401 executing processing. Also, the HDD 404 stores, for example, various data, various information, etc., obtained through processing by the CPU 401.

The input unit 405 may be composed of a pointing device such a keyboard or a mouse.

The display unit 406 may be composed of a monitor such as a liquid crystal display (LCD). The display 406 may provide a Graphical User Interface (GUI) for inputting, to the network management apparatus 1, various parameters or communication parameters used in communication with other devices.

The communication I/F 407 is an interface that controls communication between the network management apparatus 1 and external devices.

At least some of the functions of each functional element of the network management apparatus 1 shown in FIG. 2 may be realized by the CPU 401 executing the program. However, at least some of the functions of each functional element of the network management apparatus 1 shown in FIG. 2 may be operated as dedicated hardware. In such case, the dedicated hardware operates under the control of the CPU 401.

<Process Flow>

Figure 5:
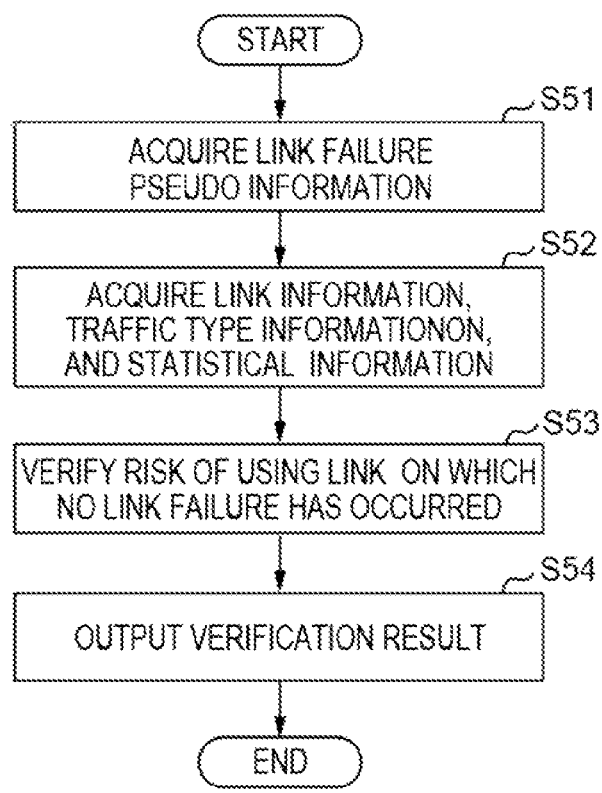
FIG. 5 illustrates a flowchart of a process performed by a network management apparatus according to a first embodiment.

FIG. 5 illustrates a flowchart of a process performed by the network management apparatus 1.

In S51, the acquisition unit 201 of the network management apparatus 1 acquires, from the analyzing apparatus 3, the link failure pseudo information for at least one of the managed links L1 to L8.

In S52, the acquisition unit 201 acquires the link information (i.e., information on a supportable communication rate for each link), the traffic type information, and the statistical information (i.e., information on an amount of traffic transmitted in the network). As described above, the acquisition unit 201 may acquire the link information from the nodes 10 to 15 and acquire the traffic type information from the nodes 10 to 15, and acquire the statistical information from the traffic monitoring apparatus 2.

In S53, the verification unit 202 verifies, in a case where it is assumed that a pseudo-failure has occurred, a risk of using a link on which no pseudo-failure has occurred (i.e., an alternative link) in order to reconfigure the network, based on the link information, the traffic type information, and the statistical information acquired by the acquisition unit 201. Specifically, the verification unit 202 verifies whether or not the service requirement for each traffic identified from the traffic type information could be satisfied when the network is reconfigured with the alternative link. The process of S53 is described below.

In S54, the output unit 203 outputs (e.g., notifies) a verification result by the verification unit 202. For example, the output unit 203 may display the verification result on the display unit 406. Alternatively, the output unit 203 may output the verification result to the analyzing apparatus 3. The analyzing apparatus 3 may, for example, analyze the conditions for reconfiguration of the network to satisfy the service requirements for all traffic to be transmitted, or may verify reconfiguration of the service requirements.

An example of the verification process by the verification unit 202 in S53 is described with reference to FIG. 1.

For example, it is assumed that, in the network configuration before the pseudo link failure, the path from the node 10 to the node 15 includes the links L1, L3, and L7. That is, the node 10, the node 11, the node 12, and the node 15 are to be used. In addition, it is assumed that the path using the links L1, L3, and L7 is capable of communication at 300 Mbps.

Furthermore, in this example, the traffic transmitted from the node 10 to the node 15 falls into three types of traffic: the traffic according to the bandwidth-guaranteed service as described above (i.e., first traffic); the traffic according to the best-effort service for mobile (i.e., second traffic); and the traffic according to the best-effort service for corporate customers (i.e., third traffic).

The communication rate that should be guaranteed for the first traffic is 10 Mbps, and the communication rate that should be guaranteed for the second traffic and the third traffic is 100 Mbps, and therefore the path using the links L1, L3, and path L7 satisfies all the requirements for the first to third traffic (10 Mbps+up to 100 Mbps+up to 100 Mbps=210 Mbps) to continue communication.

In addition, each traffic may have a preset priority for transmission. The first traffic, which is the traffic according to the bandwidth-guaranteed service, has the highest priority because it should be transmitted with the required bandwidth. The second traffic assumes to be set to the second priority level and the third traffic to the third priority level. The priority level for best-effort type services may be set, for example, by a telecommunication carrier.

Now, consider the case where a pseudo-failure on the link L7 is occurred. In such case, no pseudo-failure occurs on the links L1 and L3, so there is no problem for communication from the node 10 to the node 12, but the link from the node 11 to node 15 of the link from the node 12 to node 15 needs to be changed. Assume that the case where links L4 and L8 via node 14 are used as alternative links. In this example, it is assumed that the link L4 guarantees 300 Mbps and the link L8 guarantees 150 Mbps.

Since the link L4 guarantees 300 Mbps, the same traffic transmission is possible as before the link failure. Therefore, the verification unit 202 derives the verification result indicating that the risk of using the link L4 is low (or no risk). On the other hand, the link L8 guarantees only 150 Mbps. Therefore, in a case where the link L8 assumes to be used, the communication rate to transmit all of the first traffic to the third traffic (i.e., 210 Mbps) at the same time would not be achieved with the path from the node 10 to the node 15. In this case, the verification unit 202 verifies the risk of using the alternative link L8 based on the statistical information.

For example, it is assumed that the statistical information indicates that the traffic at up to 150 Mbps between the node 10 and the node 15 is being transmitted. In such a case, the verification unit 202 determines that it is not necessary to substantially satisfy the requirement for all of the first traffic to the third traffic (i.e., 210 Mbps), and transmission rate of 150 Mbps may practically cover the transmission of all of the first traffic to the third traffic. Then, the verification unit 202 may derive the verification result indicating that the risk of using the link L8 is low (or practically no risk).

On the other hand, in a case where it is assumed that the statistical information indicates that traffic with a maximum transmission rate of more than 150 Mbps is being transmitted, the verification unit 202 may derive the verification result indicating that the risk of using the link L8 is high.

The verification unit 202 can also derive the verification result for the alternative link according to the traffic priorities. In this example, as described above, the first traffic (10 Mbps bandwidth-guaranteed) has the highest priority, so the verification unit 202 first verifies the risk of using for the transmission of the first traffic. As described above, the link L4 guarantees a communication rate of 300 Mbps while the link L8 guarantees a communication rate of 150 Mbps. Therefore, the verification unit 202 derive the verification result indicating that the risk of using the link L4 and the link L8 for the first traffic is low (or no risk).

The verification unit 202 then verifies the risk for the second traffic with the second priority and the third traffic with the third priority based on statistical information. For example, it is assumed that the statistical information indicates that the traffic of up to 150 Mbps is being transmitted between the node 10 and the node 15.

Under the situation, the verification unit 202 first verifies the risk for the transmission of the second traffic with the second priority. The link L4 (300 Mbps) and the link L8 (150 Mbps) have enough bandwidth for the transmission of the second traffic (up to 100 Mbps) even if the transmission of the first traffic (10 Mbps bandwidth-guaranteed) is added. Therefore, the verification unit 202 derives the varication result indicating that the risk of using the link L4 and link L8 for the second traffic is low (or no risk).

Finally, under the situation, the verification unit 202 verifies the risk for the transmission of the third traffic with the third priority. The link L4 (300 Mbps) has enough bandwidth for the transmission of third traffic (up to 100 Mbps) even if the transmission of the first traffic (10 Mbps bandwidth-guaranteed) and the second traffic (up to 100 Mbps) is added. Therefore, the verification unit 202 derives the verification result indicating that the risk of using the link L4 for the third traffic is low (or no risk).

On the other hand, in addition to the first and second traffic, the third traffic cannot be transmitted at the maximum transmission rate with the link L8 (150 Mbps). However, since the statistical information indicates that the traffic of up to 150 Mbps is being transmitted, the substantial risk is not so high (i.e., slightly higher). So, the verification unit 202 derives the verification result indicating the risk of using the link L8 is slightly higher.

In the above example, the case of the link L4 and the link L8 as alternative links is explained. The above verification may be performed for all links that could be configured from the node 10 to the node 15 (i.e., links where no pseudo link failure has occurred).

The verification unit 202 may further verify the risk and derive the verification result based on a transmission availability/priority of each path and each traffic formed by links including an alternative link. For example, for a path that includes an alternative link, in a case where the first traffic and the second traffic is available for transmission but the third traffic is not, the risk may be derivable as "minor risk" with a low risk, in a case where the first traffic is available but the second traffic and the third traffic is not, the risk may be derivable as "major risk" with a medium risk, and in a case where the first to third traffic is unavailable for transmission, the risk may be derivable as "critical risk" with a high risk.

Therefore, the network management apparatus according to the present embodiment is configured to, assuming a pseudo link failure, verify the possibility of network reconfiguration using an alternative link, and perform risk verification according to the multiple traffic to be transmitted. This enables rapid network reconfiguration without stopping the functions of each node in the event of an actual link failure. In addition, in a case where it is difficult to transmit any of the multiple traffic in accordance with the service requirement, the risk thereby may be identified in advance, and appropriate handling for link failure can be planned in advance.

In the above example, the traffic according to the bandwidth-guaranteed service of 10 Mbps, the traffic according to the best-effort type service for mobile/corporate customers are used as examples of the multiple traffic to be transmitted, but it is not limited to this. For example, the traffic corresponding to network slicing may be used, where the network slicing is specified in the Fifth Generation (5G) mobile communication system standard called the New Radio (NR) in the Third Generation Partnership Project (3GPP). In the 5G, the network slicing is being standardized to meet a wide range of requirements, including even higher rates and capacities, higher reliability, and lower latency. The network slicing is a technology to realize a single network divided into multiple slices for different service requirements.

The types of the slices include, for example, a massive Machine Type Communications (mMTC), an Ultra-Reliable and Low Latency Communications (URLLC) and enhanced Mobile Broad Band (eMBB).

The mMTC is for a logistics management, Internet of Things (IoT), smart city/smart home, smart meters, smart sensors, and wearable devices, etc.

The URLLC is for smart factories, remote control of robots and drones, smart agriculture, remote surgery, traffic management, automated driving, etc.

The eMBB is for a system for high-definition video distribution, gaming, virtual reality (VR), augmented reality (AR), and for free-viewpoint video, ultra-high-density traffic in stadiums, surveillance with high-definition video, etc.

Considering the above, as the three types of traffic, the first traffic may be traffic according to the mMTC, the second traffic may be traffic according to the URLLC, and the third traffic may be traffic according to the eMBB. In such case, the priority for the first to third traffic may be set arbitrarily. In addition, the service requirement for the first to third traffic may be a requirement for the mMTC, the URLLC, and the eMBB.

In the above explanation, the process shown in FIG. 5 is described as a process by network management apparatus 1, but another simulator apparatus (e.g., an information processing apparatus) having the similar configuration as network management apparatus 1 may perform the above process. The system may be configured in a different way. In this case, the network management apparatus 1 may transfer (e.g., mirror) the acquired information to the simulator apparatus and then the simulator apparatus may perform the above process.

Second Embodiment

In the second embodiment, it is verified whether or not bandwidth is insufficient and whether or not a rate is to be increased for the links in the network based on future utilization information. In the present embodiment, the features different from the first embodiment will be explained, and common features will be omitted.

The traffic monitoring apparatus 2 predicts an amount of traffic to be transmitted in the future based on the statistical information already derived, for example, by using machine learning. In the present embodiment, information on the predicted amount of traffic is referred to as predicted utilization information.

The predicted utilization information is like the statistical information shown in FIG. 4. That is, the predicted utilization information indicates the day of the week (weekdays, Saturdays, Sundays, and holidays) and predicted hourly traffic volume per day.

Furthermore, the traffic monitoring apparatus 2 may predict that, in a case where there is a customer-attracting event on a certain date and time, the amount of traffic on that date and time will increase.

If traffic from a new service other than the traffic being transmitted at the present time is to be transmitted in the future, The traffic monitoring apparatus 2 may predict that the amount of traffic will increase from the time the new service is introduced.

The verification unit 202 verifies whether or not links among the plurality of nodes are likely to experience bandwidth shortage in the future based on link information (i.e., information on the communication rate supported by each link), the traffic type information, and the predicted utilization information.

<Process Flow>

Figure 6:
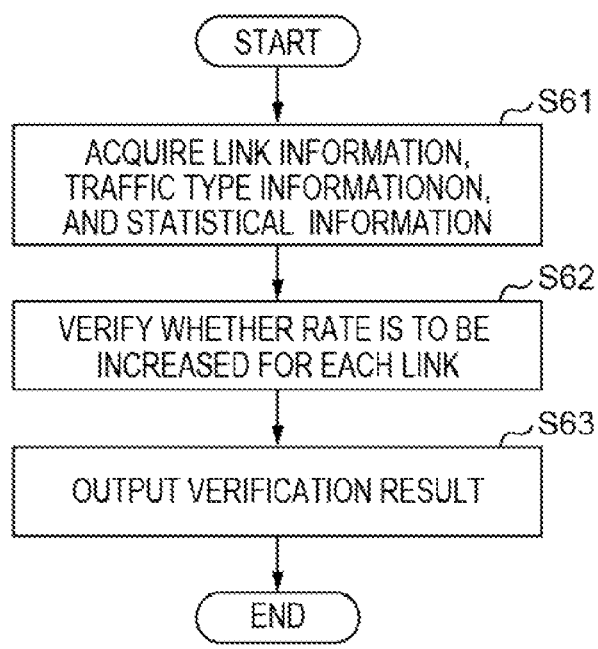
FIG. 6 illustrates a flowchart of a process performed by a network management apparatus according to a second embodiment.

FIG. 6 illustrates a flowchart of ae process performed by the network management apparatus 1.

In S61, the acquisition unit 201 acquires the link information, the traffic type information, and the predicted utilization information. The acquisition unit 201 acquires the link information from the nodes 10 to 15, etc., and traffic type information from the nodes 10-15, etc., and the predicted utilization information from the traffic monitoring apparatus 2.

In S62, the verification unit 202 verifies whether or not the rate is to be increased (i.e., the bandwidth is to be increased) for each link based on the link information, the traffic type information, and the predicted utilization information. Specifically, referring to FIG. 1, the verification unit 202 understands, from the link information, the supportable communication rate for the current links L1 to L8, and from the traffic type information, the type of traffic to be transmitted on the links L1 to L8. Then, the verification unit 202 determines, taking into account the predicted utilization information, whether the total amount of traffic expected to be transmitted on the links L1 to L8 in the future can be covered by the supportable communication rate for the current links L1 to L8, and whether the rate is to be increased (i.e., the bandwidth is to be increased). The verification unit 202 may verify whether the rate is to be increased for all of the links L1 to L8, or it may verify whether the rate is to be increased for part of the links such as one or more links in the path that is currently in use. The process of S62 is described below.

In S63, the output unit 203 outputs (e.g., notifies) the verification result by the verification unit 203. For example, the output unit 203 displays the verification results on the display unit 406. Alternatively, the output unit 203 outputs the verification results to the analyzing apparatus 3, and the analyzing apparatus 3 may notify a telecommunications carrier, etc., that the communication rate needs to be increased in the links L1 to L8, i.e., that bandwidth needs to be increased for the links.

Next, the specific example of the verification process by the verification unit 202 in S62 is described.

For example, suppose that maximum communication rate supported by the path through the links L1 to L8 between the node 10 and the node 15 is 100 Mbps. Let us assume that the traffic transmitted from the node 10 to the node 15 is three types of traffic: the traffic according to the bandwidth-guaranteed service (i.e., first traffic); the traffic according to the best-effort service traffic for mobile (i.e., second traffic); and the traffic according to the best-effort service traffic corporate customers (i.e., third traffic).

The rate that should be guaranteed for the first traffic is 10 Mbps, and the rate that should be guaranteed for the second traffic and the third traffic is 100 Mbps. The maximum communication rate supported by the path through the links L1 to L8 (100 Mbps) does not satisfy all the requirements of the first to third traffic (210 Mbps), but in view of on the practical amount of traffic, communication is able to continue. The verification unit 202 may acquire the statistical information from the traffic monitoring apparatus 2 and determine whether such communication can be continued using the statistical information.

Suppose that the verification unit 202 predicts from the predicted utilization information that the amount of traffic will increase at a certain date and time, after one month, when an even to attract customers is held. The verification unit 202 further predicts that such an event will increase the traffic, especially by the best-effort type service for mobile, and that the maximum communication rate of 100 Mbps will be used. The verification unit 202 then determines that the communication rate in addition to the first traffic for which bandwidth should be guaranteed (i.e., 10 Mbps+100 Mbps=110 Mbps) is higher than the current supportable rate (i.e., 100 Mbps).

In such a case, the verification unit 202 concludes that the communication rate supported by the current link is insufficient for the date and time. Therefore, for example, the verification unit 202 derives the verification result indicating that bandwidth is to be increased on the links L1 to L8. Alternatively, the verification unit 202 may identify from the link information the links L1 to L8 on which the rate is to be increased, and then derive the verification result indicating how much the rate is to be increased (i.e., how much bandwidth is to be increased).

The verification results derived by the verification unit 202 may be notified via the output unit 203 and the analyzing apparatus 3 as described above, and thus a telecommunication carrier or the like may take countermeasures in advance. This makes it possible, for example, to construct a network to increase the rate of communication links before a communication failure occurs due to an increase in communication rate.

The above explanation describes an example in which no link failure is assumed, but the verification unit 202 may verify the future network configuration based on the link information, the traffic type information, and predicted utilization information on the assumption that a failure occurs on one or more of the links L1 to L8. In such case, as in the first embodiment, the analyzing apparatus 3 may assume that a pseudo-failure has occurred on at least one of the links L1 to L8, and outputs to the network management apparatus the link failure pseudo information including information of any links on which the pseudo-failure has occurred.

As described above, according to each of the present embodiments, it is possible to construct in advance a network that assumes the occurrence of pseudo link failures and future traffic, and maintain communications with stable communication quality.

While specific embodiments have been described above, the embodiments are illustrative only and are not intended to limit the scope of the invention. The apparatus and method described herein may be embodied in other forms than as described above. In addition, it is also possible to appropriately omit, replace, and change the above-described embodiment without departing from the scope of the present invention. Such omissions, substitutions and alterations fall within the scope of the appended claims and their equivalents and fall within the scope of the present invention.

REFERENCE SIGNS LIST

1: Network management apparatus, 2: Traffic monitoring apparatus, 3: Analyzing apparatus, 4: IP network, 10 to 15: Nodes, L1 to L8: Links

What is claimed is:

1. A network management apparatus comprising:
at least one memory configured to store program code; and
electronic circuitry including at least one processor, the at least one processor being configured to read and operate according to the program code, the electronic circuitry configured to:
acquire link information indicating a supportable communication rate for each of links among a plurality of nodes forming a network, wherein each link in the network is connected between at least two nodes from the plurality of nodes;
acquire traffic type information indicating a traffic type of traffic transmitted on at least one link among the plurality of nodes;
acquire statistical information indicating an amount of the traffic transmitted among the plurality of nodes including the at least one link; and
verify, in a case where it is assumed that a pseudo-failure has occurred on a first link among the plurality of the nodes, a risk of reconfiguring the network using a second link among the plurality of the nodes on which no pseudo-failure has occurred as an alternative link based on the link information, the traffic type information, and the statistical information
wherein the second link is different from the first link.

2. The network management apparatus according to claim 1, wherein the electronic circuitry is further configured to verify the risk for each of a plurality of traffic types.

3. The network management apparatus according to claim 2, wherein each of the traffic types is assigned a priority, and wherein the electronic circuitry is further configured to verify the risk for each of the traffic types in order of the priority.

4. The network management apparatus according to claim 1, wherein the electronic circuitry is configured to verify the risk of using one or more paths formed by links including one or more links on which no pseudo-failure has occurred.

5. The network management apparatus according to claim 1, the electronic circuitry further configured to notify a result of the verification.

6. The network management apparatus according to claim 1, wherein the traffic type includes traffic according to a bandwidth-guaranteed service and traffic according to best-effort type service.

7. The network management apparatus according to claim 1, wherein the traffic type corresponds to a type of network slicing as specified in the Third Generation Partnership Project (3GPP).

8. A network management apparatus comprising:
at least one memory configured to store program code; and
electronic circuitry including at least one processor, the at least one processor being configured to read and operate according to the program code, the electronic circuitry configured to:
acquire link information indicating a supportable communication rate for each of links among a plurality of nodes forming a network, wherein each link in the network is connected between at least two nodes from the plurality of nodes;
acquire traffic type information indicating traffic types of traffic transmitted on at least one link among the plurality of nodes;
acquire predicted utilization information indicating a predicted amount of traffic among the plurality of nodes including the at least one link; and
verify whether a rate is to be increased for each of the links among the plurality of nodes based on the link information, the traffic type information, and the predicted utilization information in which a first rate of a first link among the plurality of nodes is increased and a second rate of a second link among the plurality of nodes is not increased,
wherein the second link is different from the first link.

9. A network management method comprising:
acquiring link information indicating a supportable communication rate for each of links among a plurality of nodes forming a network, wherein each link in the network is connected between at least two nodes from the plurality of nodes;

acquiring traffic type information indicating a traffic type of traffic transmitted on at least one link among the plurality of nodes;

acquiring statistical information indicating an amount of traffic among the plurality of nodes including the at least one link; and verifying, in a case where a pseudo-failure has occurred on a first link among the plurality of the nodes, a risk of reconfiguring the network using a second link among the plurality of nodes on which no pseudo-failure has occurred as an alternative link based on the link information, the traffic type information, and the statistical information, wherein the second link is different from the first link.

10. A network management method comprising:

acquiring link information indicating a supportable communication rate for each of links among a plurality of nodes forming a network, wherein each link in the network is connected between at least two nodes from the plurality of nodes;

acquiring traffic type information indicating a traffic type of traffic transmitted on at least one link among the plurality of nodes;

acquiring predicted utilization information indicating a predicted amount of traffic among the plurality of nodes including the at least one link; and verifying whether a rate is to be increased for each of the links among the plurality of nodes based on the link information, the traffic type information, and the predicted utilization information in which a first rate of a first link among the plurality of nodes is increased and a second rate of a second link among the plurality of nodes is not increased, wherein the second link is different from the first link.

11. A non-transitory computer readable medium having instructions stored therein, which when executed by a processor cause the processor to perform:

a first acquisition process for acquiring link information indicating a supportable communication rate for each of links among a plurality of nodes forming a network, wherein each link in the network is connected between at least two nodes from the plurality of nodes;

a second acquisition process for acquiring traffic type information indicating a traffic type of traffic transmitted on at least one link among the plurality of nodes;

a third acquisition process for acquiring statistical information indicating an amount of the traffic transmitted among the plurality of nodes including the at least one link; and a verification process for verifying, in a case where it is assumed that a pseudo-failure has occurred on a first link among the plurality of the nodes, a risk of using a second link among the plurality of nodes on which no pseudo-failure has occurred as an alternative link based on the link information, the traffic type information, and the statistical information, wherein the second link is different from the first link.

12. A non-transitory computer readable medium having instructions stored there, which when executed by a processor cause the processor to perform:

a first acquisition process for acquiring link information indicating a supportable communication rate for each of links among a plurality of nodes from a network, wherein each link in the network is connected between at least two nodes from the plurality of nodes;

a second acquisition process for acquiring traffic type information indicating traffic types of traffic transmitted on at least one link among the plurality of nodes;

a third acquisition process for acquiring predicted utilization information indicating a predicted amount of the traffic transmitted among the plurality of nodes including the at least one link; and a verification process for verifying whether a rate is to be increased for each of the links among the plurality of nodes based on the link information, the traffic type information, and the predicted utilization information in which a first rate of a first link among the plurality of nodes is increased and a second rate of a second link among the plurality of nodes is not increased, wherein the second link is different from the first link.

* * * * *